3,221,024
CYANOPYRROLES AND THEIR PREPARATION

Howard E. Simmons, Jr., Wilmington, Del., assignor to E. I. du Pont de Nemours and Company, Wilmington, Del., a corporation of Delaware
No Drawing. Filed Sept. 14, 1962, Ser. No. 223,825
16 Claims. (Cl. 260—313)

This invention relates to new pyrrole compounds and to their preparation. More particularly, the invention relates to tetracyanopyrrole, to N-substituted derivatives of tetracyanopyrrole, and to processes for preparing these compounds.

Pyrrole is a five-membered nitrogen-containing heterocyclic compound which contains two nuclear carbon-to-carbon unsaturations and which unexpectedly resembles a benzenoid type of compound in many respects. Compounds containing the pyrrole nucleus occur frequently in natural products such as in the porphyrins of chlorophyll and hemoglobin. Compounds containing this nucleus are becoming increasingly important in medicine and in various industrial uses such as dyes and pigments. Heretofore, investigations in this field have been restricted to pyrroles having at most two cyano groups attached to the nuclear carbons.

There have now been synthesized new pyrroles and N-substituted pyrroles having four cyano groups attached to the nuclear carbons. These compounds have the structural formula

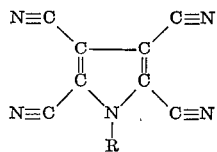

wherein R is hydrogen, an alkyl group, or a cationic group such as a metal, ammonium or sulfonium ion.

The new substituted pyrroles of this invention can be divided into two subclasses: (I) free tetracyanopyrrole and its covalent N-alkyl derivatives and (II) ionic salts of tetracyanopyrrole. Tetracyanopyrrole and N-methyltetracyanopyrrole are off-white crystalline solids with high decomposition temperatures. The free tetracyanopyrrole exhibits strong acidic properties with $pK_a = 2.71$. This acidic nature makes possible numerous ionic salts. Reaction with tetramethylammonium hydroxide, for example, yields the tetramethylammonium salt, a white solid. Similar neutralization products can be prepared from metal oxides and hydroxides as reactants. The salts can also be prepared by metathetical reactions. Thus, reaction of sodium tetracyanopyrrolate with trimethylsulfonium iodide gives the trimethylsulfonium salt. Reaction with silver nitrate yields the silver salt, a tan solid with high decomposition temperature. Similar metathetical reactions yield other tetracyanopyrrolate salts including $Li^+$, $Na^+$, $Mg^{++}$, $Al^{+++}$, $K^+$, $Ca^{++}$, $Ti^{++++}$, $Cr^{+++}$, $Mn^{++}$, $Fe^{++}$, $Fe^{+++}$, $Co^{++}$, $Co^{+++}$, $Ni^{++}$, $Ni^{+++}$, $Cu^{++}$, $Zn^{++}$, $Rb^+$, $Sr^{++}$, $Mo^{++}$, $Cd^{++}$, $Sn^{++}$, $Cs^+$, $Ba^{++}$, $Hg^{++}$, $Pb^{++}$ $Bi^{+++}$ $(CH_3CH_2)_4N^+$, $NH_4^+$, and $(CH_3CH_2)_3S^+$.

The new substituted pyrroles of this invention are obtained by reacting an ionic azide with tetracyano-1,4-dithiin in a nonacidic solvent. The ionic tetracyanopyrrolate thus obtained can be isolated as the tetramethylammonium salt and can be subsequently acidified by any convenient method, such as use of ion-exchange resins, to give the free tetracyanopyrrole.

Alkylation of the 1-position in tetracyanopyrrole yields the N-alkyl derivative. Diazomethane can be used to alkylate tetracyanopyrrole or, alternatively, alkyl halides such as ethyl bromide, butyl iodide, cyclohexyl bromide, 4-methylhexyl bromide, and octyl iodide can be used to alkylate salts of tetracyanopyrrole.

The tetracyano-1,4-dithiin used as reactant in making tetracyanopyrrole can be prepared as described in U.S. patent 3,008,967.

Any ionic azide, including $NaN_3$, $NH_4N_3$, $Ba(N_3)_2$, $Ca(N_3)_2$, $LiN_3$, $(CH_3CH_2)_4NN_3$, and $KN_3$ can be used as the other reactant in preparing tetracyanopyrrole. $NaN_3$ is the reactant of choice because of its ready availability.

The reaction between the ionic azide and tetracyano-1,4-dithiin can be carried out at any temperature below the decomposition temperatures of the reactants and products. Reaction temperatures in the range of $-25°$ to $200°$ C. can be used. Temperatures in the range of $-15°$ to $80°$ C. have been found particularly convenient. The solvent must be non-acidic, suitable examples being aliphatic and aromatic nitriles such as acetonitrile and benzonitrile, cyclic and noncyclic ethers such as dioxane and diethyl ether, alcohols such as ethanol and cyclohexanol, primary and secondary amides such as N,N-dimethylformamide and N-methylacetamide, esters such as ethyl acetate, sulfones such as dimethylsulfone, and sulfoxides such as dimethylsulfoxide.

These new substituted pyrroles can be reacted with primary amines to give pigments useful in the formation of paints and the coloring of plastics and fabrics.

The following examples illustrate the preparation and properties of new substituted pyrroles within the scope of this invention.

EXAMPLE I

*Tetramethylammonium tetracyanopyrrolate synthesis*

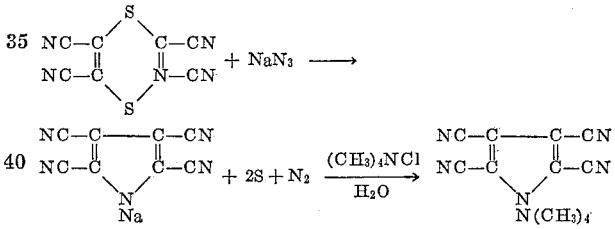

A. Tetracyanodithiin (10.8 g., 0.05 mole), sodium azide (3.25 g., 0.05 mole), and 200 ml. of ethanol were mixed and stirred overnight. The dark red reaction mixture was filtered to remove 1.15 g. (72% of 1 mole) of elemental sulfur, M.P. 116° C., and the volatile material removed from the filtrate to give a black oil. Water (200 ml.) was added to this oil and the brown solid (1.1 g.) which formed and which contained appreciable amounts of sulfur was removed by filtration. The aqueous filtrate was decolorized with carbon black and stirred at ice bath temperatures while 11 g. of tetramethylammonium chloride was added as a saturated aqueous solution. A reddish-brown solid (7.52 g., 62.5% yield) consisting of the tetramethylammonium salt of tetracyanopyrrole was removed by filtration, washed well with water and dried in vacuo. While crystals, M.P. 282-283° C., of this compound were prepared by several recrystallizations from isopropyl alcohol. The infrared spectrum showed absorption assignable to $C \equiv N$ (4.52μ), $C = C/C = N$ (6.78 and 6.90μ), tetramethylammonium (3.33, 6.75, and 10.55μ) and a medium absorption at 9.33μ as major features. The UV spectrum showed $\lambda_{max.}^{EtOH}$ 268 ($\epsilon = 10,800$), 254 ($\epsilon = 10,400$), 235 ($\epsilon = 38,600$), 227 ($\epsilon = 31,900$)

as major absorptions and three minor (probably impurity) absorptions at 486, 388, 318 ($k$ values all below 1.5).

*Analysis.*—Calc'd for $C_{12}H_{12}N_{16}$: C, 59.97; H, 5.04; N, 34.98. Found: C, 61.15; H, 5.14; N, 34.22, 34.45.

B. Tetracyano-1,4-dithiin (2.16 g., 0.01 mole), $NaN_3$ (0.65 g., 0.01 mole) and 100 ml. $CH_3CN$ were stirred in an apparatus set up to collect evolved $N_2$. A brown solution resulted and 230 ml. of $N_2$ were evolved. Filtration removed the sulfur and evaporation of the filtrate gave crude sodium tetracyanopyrrolate as a dark brown solid. Conversion to tetramethylammonium salt was carried out as described in Example I–A, supra. Crude yield was 2.95 g. (theoretical, 2.40). Recrystallization from water gave 1.45 g. of tan crystals (M.P. 280–283° C.) whose IR was identical with that obtained from Example I–A, supra.

EXAMPLE II

*Tetracyanopyrrole synthesis*

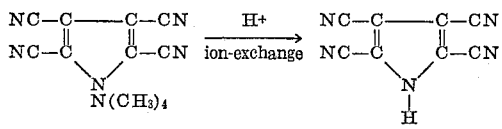

An ion-exchange column consisting of 200 g. of sulfonated polystyrene resin which had been thoroughly washed with acetonitrile was prepared. A solution of 1.94 g. of tetramethylammonium tetracyanopyrrolate in 25 ml. of acetonitrile was charged to the column. The free pyrrole was eluted with acetonitrile and the eluent evaporated to dryness under a stream of dry nitrogen. Sublimation of the black residue at 0.1 mm. (200° C.) gave a 20% yield of an off-white solid which melted at ca. 193–209° C. (with decomposition). A sample was resublimed without significant change in melting point for analysis. The infrared spectrum had absorptions assignable to NH ($3.15\mu$), C=C/C=N ($6.38$, $6.69\mu$), and nitrile ($4.45\mu$) while the ultraviolet spectrum showed $\lambda_{max.}^{EtOH}$ 269 (10,500) and 236 m$\mu$ (37,000)

*Analysis.*—Calc'd for $C_8HN_5$: C, 57.50; H, 0.60; N, 41.90. Found: C, 57.42; H, 0.88; N, 41.70.

Additional characterization of tetracyanopyrrole was obtained on a sample recrystallized from methylene dichloride. Neutralization equivalent: Calculated for $C_8HN_5$: 167. Found: 170.7. $pK_a=2.71$.

EXAMPLE III

*M-methyltetracyanopyrrole*

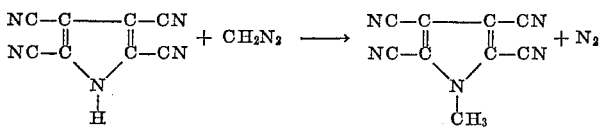

Tetramethylammonium tetracyanopyrrolate (2.40 g., 0.01 mole) was acidified in acetonitrile as described in Example II. The eluent was added slowly to a solution of about 0.02 mole of diazomethane and the resulting solution allowed to stand overnight. Removal of the solvent gave a semicrystalline mass which was recrystallized several times from methylene chloride/methyl cyclohexane to obtain off-white crystals of N-methyltetracyanopyrrole, M.P., 168–188.5° C. with no apparent decomposition to 260° C. The yield was 0.45 g. (25% of theory). The infrared spectrum showed absorptions assignable to CH (3.4, 3.55$\mu$), C≡N (4.46$\mu$) and C=C/C=N (6.65$\mu$), and no absorptions at 3.1$\mu$ for NH. The ultraviolet spectrum showed $\lambda_{max.}^{EtOH}$ at 262 ($\epsilon=11,000$), 230 ($\epsilon=34,500$) 223 ($\epsilon=35,500$)

and a shoulder at 283 ($\epsilon=2850$).

*Analysis.*—Calc'd for $C_9H_3N_5$: C, 59.69; H, 1.67; N, 38.68; M.W., 181.15. Found: C, 59.90; H, 1.95; N, 40.42; M.W. (in ethylene dichloride) 176.

EXAMPLE IV

*Silver tetracyanopyrrolate*

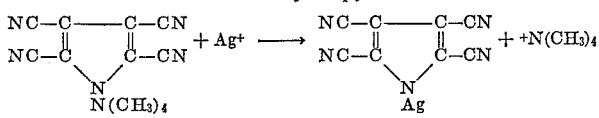

A solution of 1.70 g. (0.01 mole) of silver nitrate in 25 ml. of water was added with rapid stirring to a hot (80° C.) aqueous (10 ml.) ethanol (100 ml.) solution containing 2.40 g. (0.01 mole) of tetramethylammonium tetracyanopyrrolate. The tan solid which precipitated was removed by filtration, washed well with ethanol and dried in vacuo. The infrared spectrum of the crude silver tetracyanopyrrolate thus precipitated showed major absorptions assignable to C≡N ($4.47\mu$) and C=C ($6.75\mu$). The product had a melting point of 273–275° C.

The tetracyanopyrrole ion is useful in the gravimetric determination of silver. The analysis is based on the formation of the highly insoluble silver tetracyanopyrrolate when a soluble salt of tetracyanopyrrole, e.g., the sodium salt, is added to an aqueous solution of a soluble silver salt, e.g., silver nitrate.

EXAMPLE V

*N-ethyl tetracyanopyrrole*

A mixture of 2.40 g. (0.010 mole) tetramethylammonium tetracyanopyrrole, 1.09 g. (0.01 mole) of ethyl bromide, and 10 ml. of ethylene dichloride was heated in a sealed tube at 200° C. for 8 hours. The dark contents of the tube were chromatographed on acid-washed alumina using methylene chloride as an eluent to give 0.97 g. (50% of crude N-ethyl tetracyanopyrrole as a white solid, M.P. 105–120° C. Repeated crystallization from aqueous methanol gave white crystals, M.P. 110–126° C., whose infrared spectrum was very similar to N-methyl tetracyanopyrrole.

*Analysis.*—Calc'd for $C_{10}H_5N_5$: C, 61.20; H, 2.58; N, 35.88. Found: C, 58.12; H, 2.10; N, 34.44.

EXAMPLE VI

*Pigment from N-methyl tetracyanopyrrole*

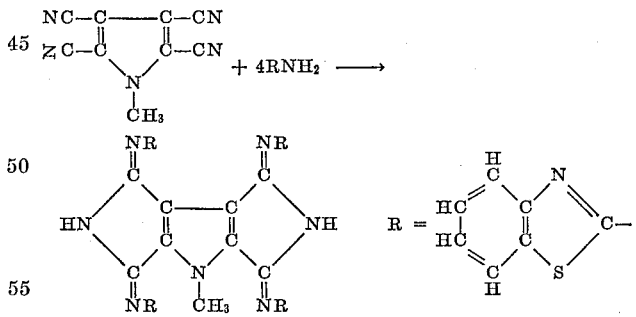

A mixture of 0.181 g. (0.001 mole) of N-methyl tetracyanopyrrole, 0.6 g. (0.004 mole) of 2-aminobenzothiazole, and trichlorobenzene (4 ml.) was heated under reflux for 1.5 hours. The yellow pigment which formed during this time was removed by filtration and washed with ethanol. The crude product, M.P. 320–321° C., was obtained in 0.56 g. (75%) yield. The infrared spectrum of this pigment showed major absorptions at 6.17, 6.50, 6.97, 8.24, 13.23, and 13.80$\mu$, while the ultraviolet spectrum showed the following absorption maxima with the respective minimum extinction coefficient: 500 (16,700), 469 (25,200), 390 (33,800), 293 (32,000), 283 m$\mu$ (31,300).

*Analysis.*—Calc'd for $C_{37}H_{21}N_{11}S_4$: C, 59.49; H, 2.84; N, 20.65; S, 17.20. Found: C, 57.97; H, 3.09; N, 19.87; S, 15.87.

In a similar fashion, tetracyanopyrrole reacts with 2-aminobenzothiazole to yield a reddish-brown pigment, M.P. 298–295° C. Other primary amines which can be reacted with tetracyanopyrrole or its N-alkyl derivatives to form pigments include 2-amino-6-chlorobenzothiazole, 3-aminoquinoline, and p-anisidine. These pigments are useful in the formulation of paints and in the coloring of fabrics, plastics, and the like.

As many widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A compound of the formula

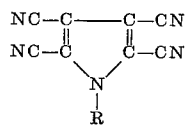

wherein R is a member of the class consisting of hydrogen, alkyl and cycloalkyl groups of at most 8 carbon atoms, and cations reactive with an acid having a $pK_a$ value of 2.71.

2. A compound of the formula

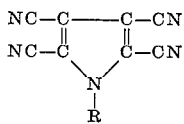

wherein R is a metal ion of atomic number 3–83 inclusive.

3. 2,3,4,5-tetracyanopyrrole.
4. Tetramethylammonium tetracyanopyrrolate.
5. N-methyltetracyanopyrrole.
6. Silver tetracyanopyrrolate.
7. Process which comprises contacting and reacting, in the presence of an organic nonacidic solvent and at a temperature in the range from −25° C. to +200° C., an ionic azide with tetracyano-1,4-dithiin and recovering the resultant tetracyanopyrrolate.
8. Process which comprises contacting and reacting, in the presence of a nonacidic solvent and at a temperature in the range −15° C. to 80° C., an ionic azide with tetracyano-1,4-dithiin and recovering the resultant tetracyanopyrrolate.
9. Process which comprises contacting and mixing, in an ethanol medium and at about room temperature, sodium azide with tetracyano-1,4-dithiin, adding tetramethylammonium chloride, and recovering the resultant tetramethylammonium tetracyanopyrrolate.
10. A compound of the formula

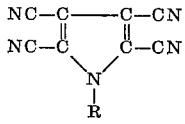

wherein R is an alkylammonium ion selected from the group consisting of tetramethylammonium and tetraethylammonium.

11. A compound of the formula

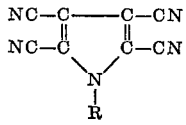

wherein R is a sulfonium ion selected from the group consisting of trimethyl sulfonium and triethyl sulfonium.

12. Ammonium tetracyanopyrrolate.
13. Process which comprises contacting and reacting, in an acetonitrile medium and at about room temperature, sodium azide with tetracyano-1,4-dithiin to obtain sodium tetracyanopyrrolate, adding and mixing tetramethylammonium chloride to obtain tetramethylammonium tetracyanopyrrolate, passing, using acetonitrile as eluent, the resultant tetramethylammonium tetracyanopyrrolate solution through an ion-exchange column consisting of sulfonated polystyrene resin, and recovering the resultant tetracyanopyrrole.
14. Process which comprises contacting and reacting, in an acetonitrile medium and at about room temperature, sodium azide with tetracyano-1,4-dithiin to obtain sodium tetracyanopyrrolate, adding and mixing tetramethylammonium chloride to obtain tetramethylammonium tetracyanopyrrolate, passing, using acetonitrile as eluent, the resultant tetramethylammonium tetracyanopyrrolate solution through an ion-exchange column consisting of sulfonated polystyrene resin to obtain an acetonitrile solution of tetracyanopyrrole, adding and reacting said solution with diazomethane, and recovering the resultant N-methyltetracyanopyrrole.
15. Process which comprises contacting and reacting, in an acetonitrile medium and at about room temperature, sodium azide with tetracyano-1,4-dithiin to obtain sodium tetracyanopyrrolate, adding and mixing tetramethylammonium chloride to obtain tetramethylammonium tetracyanopyrrolate, mixing and reacting an alkyl halide with said tetramethylammonium tetracyanopyrrolate, and recovering the resultant N-alkyltetracyanopyrrole.
16. Process which comprises contacting and reacting, in an acetonitrile medium and at about room temperature, sodium azide with tetracyano-1,4-dithiin to obtain sodium tetracyanopyrrolate, adding and mixing tetramethylammonium chloride to obtain tetramethylammonium tetracyanopyrrolate, adding and reacting a metal salt solution, and recovering the resultant metal salt of tetracyanopyrrole.

References Cited by the Examiner
UNITED STATES PATENTS

| | | | |
|---|---|---|---|
| 3,010,971 | 11/1961 | Kaiser et al. | 260—313 |
| 3,052,681 | 9/1962 | Simmons | 260—313 |
| 3,060,198 | 10/1962 | Weis | 260—313 |
| 3,072,530 | 1/1963 | Hofmann et al. | 260—319 |

OTHER REFERENCES

Fieser et al.: Advanced Organic Chemistry, Reinhold Pub. Corp., New York, 1961, pages 307, 495–6 and 673–4.

Richter: The Chemistry of Carbon Compounds, volume IV, pages 14–15 (1947).

Streatfield: Chem. and Ind., November 14, 1953, pages 1214–1221.

NICHOLAS S. RIZZO, *Primary Examiner*.

IRVING MARCUS, *Examiner*.